Nov. 8, 1955 — H. J. MUSSELMAN — 2,722,707
MIRROR WIPER FOR TRUCKS AND AUTOMOBILES
Filed Oct. 15, 1952

Harry J. Musselman
INVENTOR

BY *C. A. Snow & Co.*
ATTORNEYS

United States Patent Office 2,722,707
Patented Nov. 8, 1955

2,722,707

MIRROR WIPER FOR TRUCKS AND AUTOMOBILES

Harry J. Musselman, Nazareth, Pa.

Application October 15, 1952, Serial No. 314,816

1 Claim. (Cl. 15—255)

This invention relates to exposed rear view mirrors used on trucks or motor vehicles, the primary object of the invention being to provide rear view mirrors having wiping means for freeing foreign matter from such mirrors.

Another object of the invention is to provide a rear view mirror wiper which will be readily applicable from a position within the cab of a truck or within the body of a motor vehicle, for maintaining the mirror clean, for the convenience of the operator of the vehicle, with a view to contributing to the safe operation of the vehicle.

Still another object of the invention is to provide a combined exposed mirror and wiper, the construction being such that the mirror and wiper may be positioned on various types of vehicles, without the necessity of making alterations or providing structure to mount the same.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

Referring to the drawing.

Figure 1:
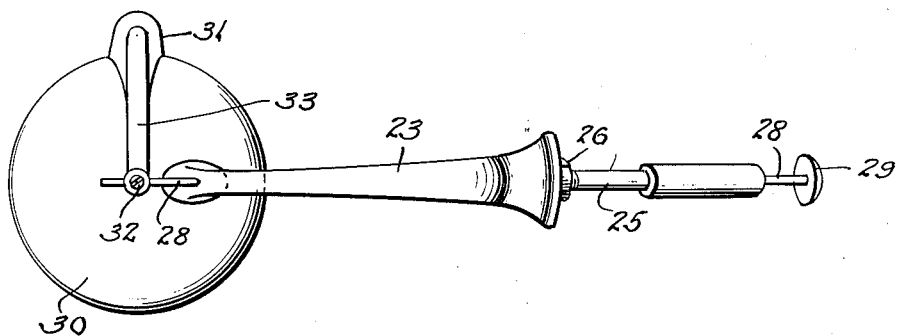
Fig. 1 is a rear elevational view of an exposed mirror mounted on a truck or other vehicle.
Figure 2:
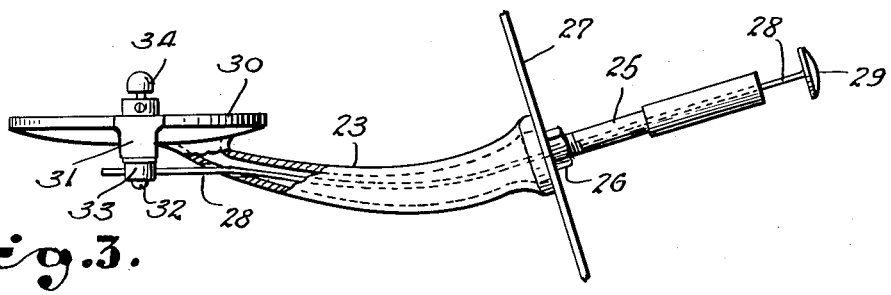
Fig. 2 is a plan view thereof, a portion of the hollow mirror supporting arm being shown in section.
Figure 3:
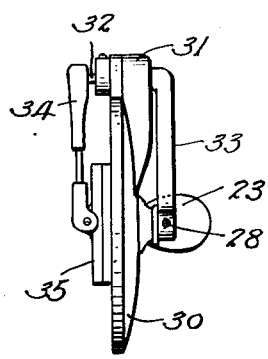
Fig. 3 is an end elevational view of the mirror.
Figure 4:
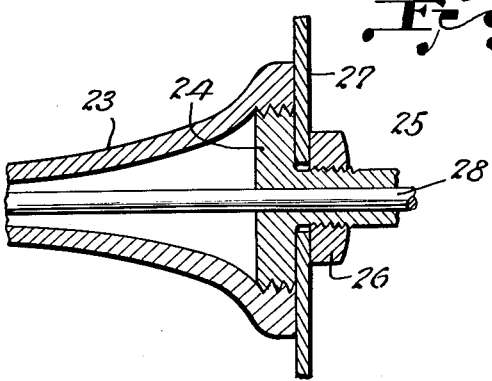
Fig. 4 is an enlarged sectional view through the hollow mirror supporting arm of the invention.

Referring to the drawing in detail, the reference character 23 indicates a curved hollow mirror supporting arm which is formed with internal threads at one end thereof, in which the nut 24 is threaded, the nut 24 having the threaded extension 25 on which the nut 26 is mounted, the nut 26 cooperating with the nut 24 in clamping the member 27 which forms a part of the truck or vehicle structure.

The nut 24, together with its extension 25, provides a bearing for the flexible shaft or rod 28, which is provided with the operating knob 29 on one end thereof by means of which the flexible shaft or rod 28 is operated.

Secured to the upper or free end of the supporting arm 23, is the mirror 30, which is formed with an offset enlargement 31 formed with a bore extending therethrough, which bore provides a bearing for the shaft 32, which is formed with the shank 33 on one end thereof, to which shank the flexible shaft or rod 28 is adjustably connected.

Secured on the opposite end of the shaft 32 is the wiper arm 34 to which the wiper blade 35 is connected, the wiper blade being held against the mirror 30.

From the foregoing it will be seen that due to the construction shown and described, I have provided means for wiping mirrors of an exposed character such as used on trucks or automobiles, the wipers being operated from a point within the cab of the truck or body of the vehicle, to maintain the mirror clean of foreign matter.

It will also be seen that due to the construction as shown and described, the device may be readily and easily attached to trucks or motor vehicles, without the necessity of making changes in the structure to mount the same.

Having thus described the invention, what is claimed is:

In a rear view mirror construction of the exposed type, a tubular supporting arm having one of its ends attached to a motor vehicle frame, a rear view mirror secured to the other end of said supporting arm at a point spaced laterally of the center axis of the mirror, said tubular supporting arm having an opening in the wall thereof adjacent to said mirror, said opening communicating with the interior of the tubular supporting arm, an oscillating shaft mounted on the mirror and secured over one edge thereof, and adjustable wiper arm secured to one end of said shaft, a flexible shaft extending through said tubular supporting arm and opening in said arm, and means for connecting said flexible shaft to said oscillating shaft effecting movement of said oscillating shaft and wiper as said flexible shaft is moved through said tubular shaft.

References Cited in the file of this patent

UNITED STATES PATENTS 1,482,428     Dooley _____ Feb. 5, 1924

FOREIGN PATENTS 623,156     France _____ Mar. 14, 1927